United States Patent
Huang-Fu et al.

(10) Patent No.: US 10,856,340 B2
(45) Date of Patent: Dec. 1, 2020

(54) ENHANCED CELL SELECTION MECHANISMS IN MOBILE COMMUNICATIONS

(71) Applicant: MediaTek Inc., Hsinchu (TW)

(72) Inventors: Chien-Chun Huang-Fu, Hsinchu (TW); Tsang-Wei Yu, Hsinchu (TW); Tao Chen, Beijing (CN); I-Kang Fu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/124,443

(22) Filed: Sep. 7, 2018

(65) Prior Publication Data

US 2019/0090289 A1     Mar. 21, 2019

Related U.S. Application Data

(60) Provisional application No. 62/558,890, filed on Sep. 15, 2017, provisional application No. 62/560,697, (Continued)

(51) Int. Cl.
*H04L 5/14* (2006.01)
*H04W 76/10* (2018.01)
(Continued)

(52) U.S. Cl.
CPC ......... *H04W 76/10* (2018.02); *H04L 41/0803* (2013.01); *H04L 67/306* (2013.01);
(Continued)

(58) Field of Classification Search
None
See application file for complete search history.

(56) References Cited

U.S. PATENT DOCUMENTS

| | | | |
|---|---|---|---|
| 8,965,366 B1 * | 2/2015 | Somayajula | H04W 60/00 455/435.1 |
| 2003/0040311 A1 * | 2/2003 | Choi | H04W 48/20 455/434 |

(Continued)

FOREIGN PATENT DOCUMENTS

CN     106507439 A     3/2017

OTHER PUBLICATIONS

State Intellectual Property Office, International Search Report and Written Opinion for International Patent Application No. PCT/CN2018/105388, dated Nov. 28, 2018.
(Continued)

*Primary Examiner* — Sithu Ko
(74) *Attorney, Agent, or Firm* — Han IP PLLC; Andy M. Han

(57) ABSTRACT

Various examples and schemes pertaining to enhanced cell selection mechanisms in mobile communications are described. A user equipment (UE) performs a cell selection or reselection procedure to select a cell of a wireless network and establishes a wireless connection with the selected cell. In performing the cell selection or reselection procedure, the UE determines a frequency band and a subcarrier spacing (SCS) configuration by checking a profile, and the UE performs the cell selection or reselection procedure in the frequency band based on the SCS configuration.

11 Claims, 5 Drawing Sheets

Related U.S. Application Data filed on Sep. 20, 2017, provisional application No. 62/565,196, filed on Sep. 29, 2017.

(51) Int. Cl.
| | |
|---|---|
| *H04W 48/20* | (2009.01) |
| *H04W 72/02* | (2009.01) |
| *H04L 12/24* | (2006.01) |
| *H04L 29/08* | (2006.01) |
| *H04W 72/04* | (2009.01) |
| *H04W 8/18* | (2009.01) |
| *H04W 48/18* | (2009.01) |
| *H04W 84/04* | (2009.01) |
| *H04W 88/02* | (2009.01) |

(52) U.S. Cl.
CPC ........... *H04W 48/20* (2013.01); *H04W 72/02* (2013.01); *H04W 72/044* (2013.01); *H04W 8/183* (2013.01); *H04W 48/18* (2013.01); *H04W 72/0453* (2013.01); *H04W 84/042* (2013.01); *H04W 88/02* (2013.01)

(56) References Cited

U.S. PATENT DOCUMENTS

| | | | | |
|---|---|---|---|---|
| 2009/0034438 A1* | 2/2009 | Soulie | ................... | H04L 5/0092 370/280 |
| 2010/0165882 A1 | 7/2010 | Palanki et al. | | |
| 2013/0007039 A1* | 1/2013 | Edara | ................... | H04W 48/16 707/769 |
| 2013/0051485 A1 | 2/2013 | Taori et al. | | |
| 2016/0014596 A1* | 1/2016 | Khan | ..................... | H04W 76/14 455/410 |
| 2016/0150450 A1* | 5/2016 | Balasubramanian | ........................ | H04W 36/14 370/331 |
| 2016/0352551 A1* | 12/2016 | Zhang | ................... | H04L 5/0007 |
| 2017/0331577 A1* | 11/2017 | Parkvall | ................. | H04L 5/0053 |
| 2017/0367120 A1* | 12/2017 | Murray | ............... | H04W 72/046 |
| 2018/0242229 A1* | 8/2018 | Ahluwalia | ............ | H04W 8/205 |
| 2019/0028941 A1* | 1/2019 | Zee | .................... | H04W 36/0066 |
| 2019/0059075 A1* | 2/2019 | Hayashi | ................ | H04L 5/0092 |
| 2019/0104551 A1* | 4/2019 | Deenoo | ............ | H04W 74/0833 |
| 2019/0222381 A1* | 7/2019 | Zhang | ................... | H04L 5/0048 |

OTHER PUBLICATIONS

Nokia et al., On different deployment and SS SCS combinations, 3GPP TSG-RAN1 NR AH#3, Nagoya, Japan, Sep. 18-21, 2017.
Taiwan Intellectual Property Office, Office Action for Taiwan Patent Application No. 107132125, dated Sep. 19, 2019.

* cited by examiner

200

PERFORM, BY A PROCESSOR OF A USER EQUIPMENT (UE), A CELL SELECTION OR RESELECTION PROCEDURE TO SELECT A CELL OF A WIRELESS NETWORK
210

SELECT A PUBLIC LAND MOBILE NETWORK (PLMN)
2122

SELECT THE FREQUENCY BAND
2142

DETERMINE A FREQUENCY BAND ASSOCIATED WITH THE PLMN AND A SUBCARRIER SPACING (SCS) CONFIGURATION CORRESPONDING TO THE PLMN BY CHECKING A PROFILE
2124

DETERMINE THE SCS CONFIGURATION CORRESPONDING TO THE FREQUENCY BAND BY CHECKING THE PROFILE
2144

PERFORM THE CELL SELECTION PROCEDURE IN THE FREQUENCY BAND BASED ON THE SCS CONFIGURATION
2126

PERFORM THE CELL SELECTION OR RESELECTION PROCEDURE IN THE FREQUENCY BAND BASED ON THE SCS CONFIGURATION
2146

ESTABLISH, BY THE PROCESSOR, A WIRELESS CONNECTION WITH THE SELECTED CELL
220

PERFORM, BY A PROCESSOR OF A USER EQUIPMENT (UE), A CELL SELECTION OR RESELECTION PROCEDURE TO SELECT A CELL OF A WIRELESS NETWORK
510

DETERMINE A FREQUENCY BAND AND A SUBCARRIER SPACING (SCS) CONFIGURATION BY CHECKING A PROFILE
5102

PERFORM THE CELL SELECTION OR RESELECTION PROCEDURE IN THE FREQUENCY BAND BASED ON THE SCS CONFIGURATION
5104

ESTABLISH, BY THE PROCESSOR, A WIRELESS CONNECTION WITH THE SELECTED CELL
520

FIG. 5

ENHANCED CELL SELECTION MECHANISMS IN MOBILE COMMUNICATIONS

CROSS REFERENCE TO RELATED PATENT APPLICATION(S)

The present disclosure is part of a non-provisional application claiming the priority benefit of U.S. Patent Application Nos. 62/558,890, 62/560,697 and 62/565,196, filed on 15 Sep. 2017, 20 Sep. 2017 and 29 Sep. 2017, respectively, the contents of which are incorporated by reference in their entirety.

TECHNICAL FIELD

The present disclosure is generally related to mobile communications and, more particularly, to enhanced cell selection mechanisms in mobile communications.

BACKGROUND

Unless otherwise indicated herein, approaches described in this section are not prior art to the claims listed below and are not admitted as prior art by inclusion in this section.

In $5^{th}$-Generation (5G) or New Radio (NR) mobile communications, for some specific frequency bands there are multiple default subcarrier spacing (SCS) configurations for each frequency band. Before a user equipment (UE) can exchange any message with a network (e.g., via master information block (MIB), system information block (SIB), radio resource control (RRC) and/or non-access stratum (NAS) signaling), SCS configuration can be useful for initial access by the UE. However, blind detection on which SCS configuration to utilize when there are multiple candidate SCS configurations for use tends to be very inefficient and time-consuming, thereby leading to degraded user experience.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

The present disclosure proposes a number of schemes, solutions, techniques, methods and apparatus pertaining to enhanced cell selection mechanisms in mobile communications. With the enhanced cell selection mechanism, NR configuration provisioning as well as system performance may be improved. Moreover, user experience may be improved accordingly.

In one aspect, a method may involve a processor of a UE performing a cell selection or reselection procedure to select a cell of a wireless network. The method may also involve the processor establishing a wireless connection with the selected cell. In performing the cell selection or reselection procedure, the method may involve the processor performing: (a) determining a frequency band and a subcarrier spacing (SCS) configuration corresponding to the PLMN by checking a profile; and (b) performing the cell selection or reselection procedure in the frequency band based on the SCS configuration.

In one aspect, a method may involve a processor of a UE determining a location identification (ID) of a current location of the UE. The method may also involve the processor prioritizing a PLMN list of a plurality of PLMNs according to the location ID. The method may further involve the processor performing based on the prioritized PLMN list, a cell selection or reselection procedure to select a cell of a wireless network associated with one of the plurality of PLMNs.

In one aspect, a method may involve a processor of a multi-mode UE detecting, by checking a profile, for a valid SCS configuration is available for establishing a wireless connection with a second radio access technology (RAT). The method may also involve the processor selecting one of a plurality of cell selection mechanisms responsive to no valid SCS configuration being detected. The method may further involve the processor establishing, using the selected one of the plurality of cell selection mechanisms, a wireless connection with a first cell using a first RAT different than the second RAT.

It is noteworthy that, although description provided herein may be in the context of certain radio access technologies, networks and network topologies such as 5G or NR, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, Internet of Things (IoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 2 is a flowchart of an example process in accordance with an implementation of the present disclosure.

FIG. 5 is a flowchart of an example process in accordance with an implementation of the present disclosure.

DETAILED DESCRIPTION OF PREFERRED IMPLEMENTATIONS

Figure 1:
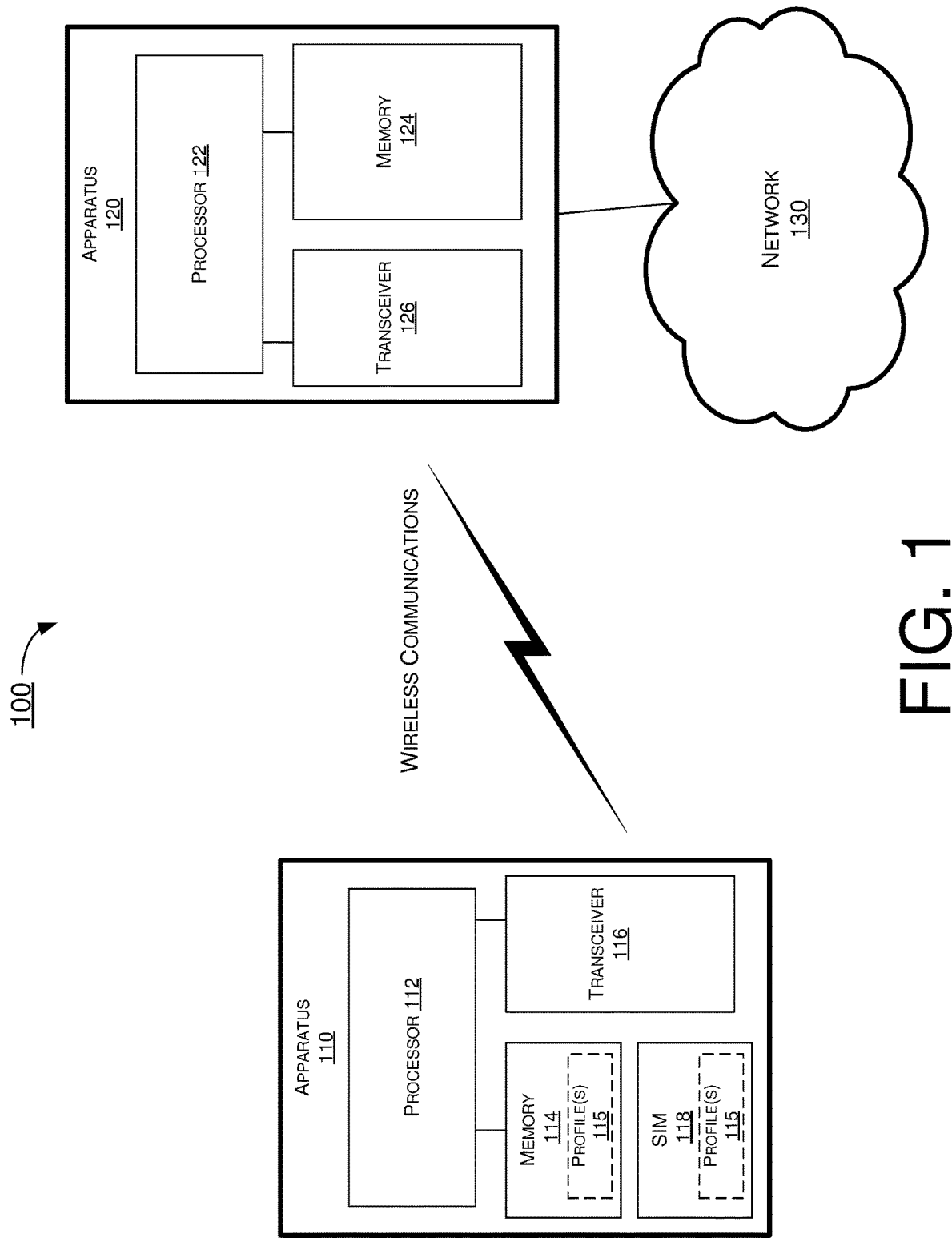
FIG. 1 is a block diagram of an example communication environment in accordance with an implementation of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to sounding reference signal design with respect to user equipment and network apparatus in mobile communications. According to the present disclosure, a number of possible schemes may be implemented separately or jointly. That is, although these possible schemes may be described below separately, two or more of these possible schemes may be implemented in one combination or another.

Under a first proposed scheme in accordance with the present disclosure, an SCS profile used by a UE for cell selection may be stored in a Subscriber Identity Module (SIM) of the UE. In the interest of brevity, the term "SIM" in the present disclosure may also refer to a Universal Subscriber Identity Module (USIM), an embedded SIM (eSIM), an embedded Universal Integrated Circuit Card (eUICC), an integrated SIM (iSIM) and/or an integrated UICC (iUICC).

Under the first proposed scheme, the SCS profile may contain one or more SCS configurations. Each of the one or more SCS configurations within the SCS profile may be associated with frequency band information (of one or more frequency bands) and/or Public Land Mobile Network (PLMN) information such as PLMN identification (PLMN ID). For instance, a given SCS configuration may be associated with a respective PLMN of a respective service provider for a given frequency band. The frequency band information may be further associated with respective channel bandwidth, a respective resource block, a respective transmission time interval (TTI) and/or a respective modulation. Also, a given frequency band may be associated with a single one or multiple SCS configurations.

Under the first proposed scheme, the SCS profile may be configured and updated by a user of the UE and/or a network to which the UE is connected (e.g., by an operator of a service provider associated with the network). Update of the SCS profile may occur after each cell selection or reselection procedure, after each cell reselection procedure and/or upon receipt of signaling (e.g., RRC signaling, NAS signaling or any other signaling used in a 3rd-Generation Partnership Project (3GPP) system) related to SCS configuration. For instance, the network may use RRC or NAS signaling to inform the UE of any neighboring cell, the frequency band(s) used by such neighboring cell(s) and SCS information corresponding to such frequency band(s). Upon receiving such information from the network, the UE may update the SCS profile stored in the SIM.

Under the first proposed scheme, for initial access, the UE may target on a particular frequency band and determine which SCS configuration of the one or more SCS configurations corresponds to the particular frequency band by checking the SCS profile stored in the SIM of the UE. Specifically, the UE may take the PLMN information in the one or more SCS configurations into consideration in determining the SCS configuration for use.

Alternatively, the UE may select a specific PLMN corresponding to a specific PLMN ID and then determine or otherwise select one or more frequency bands and the corresponding SCS configuration(s) for the specific PLMN ID by checking the SCS profile stored in the SIM of the UE. Subsequently, the UE may perform a cell selection (or reselection) procedure. It is noteworthy that there may be different priority treatments for the selected band(s). For instance, a first frequency band may have a higher priority than a second frequency band among multiple selected bands, and as such the UE may select the first frequency band or a frequency within the first frequency band (and use its corresponding SCS configuration) instead of selecting the second frequency band or any frequency within the second frequency band.

Under a second proposed scheme in accordance with the present disclosure, an SCS profile used by a UE for cell selection may be stored in a memory the UE. As with the first proposed scheme, under the second proposed scheme, the SCS profile may contain one or more SCS configurations. Each of the one or more SCS configurations within the SCS profile may be associated with frequency band information (of one or more frequency bands) and/or PLMN information such as PLMN ID. For instance, a given SCS configuration may be associated with a respective PLMN of a respective service provider for a given frequency band. The frequency band information may be further associated with channel bandwidth, resource block, TTI and/or modulation. Also, a given frequency band may be associated with a single one or multiple SCS configurations.

Under the second proposed scheme, the SCS profile may be configured and updated by a user of the UE and/or a network to which the UE is connected (e.g., by an operator of a service provider associated with the network). Update of the SCS profile may occur after each cell selection or reselection procedure, after each cell reselection procedure and/or upon receipt of signaling (e.g., RRC signaling, NAS signaling or any other signaling used in a 3GPP system) related to SCS configuration. For instance, the network may use RRC or NAS signaling to inform the UE of any neighboring cell, the frequency band(s) used by such neighboring cell(s) and SCS information corresponding to such frequency band(s). Upon receiving such information from the network, the UE may update the SCS profile stored in the memory of the UE.

Under the second proposed scheme, a size of the SCS profile may be limited to a maximum size, and there may be a corresponding validity timer (or lifetime) associated with each SCS configuration in the SCS profile. That is, each validity timer may be representative of a lifetime of a respective SCS configuration of one or more SCS configurations in the SCS profile. Each validity timer may persist across system reboot and/or SIM change. That is, the UE may be configured not to reset each validity timer upon system reboot of the UE and/or SIM change for the UE. Alternatively, each validity timer may be reset upon system reboot and/or SIM change. That is, the UE may be configured to reset each validity timer upon system reboot of the UE and/or SIM change for the UE.

The value of each validity timer may be set, configured or otherwise updated by a user of the UE or a service provider associated with a network to which the UE is connected. Upon expiration of the respective validity timer of a given SCS configuration, the UE may remove or otherwise delete such SCS configuration from the SCS profile. Accordingly, efficiency in memory utilization in the UE may be preserved as SCS configurations associated with older/expired validity timers may be deleted, overwritten or otherwise removed to free up memory space or otherwise maintain the size of the SCS profile within the maximum size.

Under the second proposed scheme, for initial access, the UE may target on a particular frequency band and determine which SCS configuration of the one or more SCS configurations corresponds to the particular frequency band by checking the SCS profile stored in the SIM of the UE. Specifically, the UE may take the PLMN information in the one or more SCS configurations into consideration in determining the SCS configuration for use.

Alternatively, the UE may select a specific PLMN corresponding to a specific PLMN ID and then determine or otherwise select one or more frequency bands and the corresponding SCS configuration(s) for the specific PLMN ID by checking the SCS profile stored in the SIM of the UE. Subsequently, the UE may perform a cell selection (or reselection) procedure. It is noteworthy that there may be different priority treatments for the selected band(s). For instance, a first frequency band may have a higher priority than a second frequency band among multiple selected bands, and as such the UE may select the first frequency band or a frequency within the first frequency band (and use its corresponding SCS configuration) instead of selecting the second frequency band or any frequency within the second frequency band.

Under a third proposed scheme in accordance with the present disclosure, memory usage in a SIM of a UE or a memory of the UE may be minimized by reduction of SCS profile storage. For a given frequency band associated with multiple SCS configurations, one of the multiple SCS configurations may be selected as a default SCS configuration for that frequency band and stored as a default value. Correspondingly, each of the other one or more SCS configurations (non-default SCS configurations) associated with such frequency band may be stored as exceptional value(s) relative to the default value of the default SCS configuration (e.g., difference(s) or delta(s) between each of the non-default SCS configuration and the default SCS configuration). Thus, as each of the non-default SCS configurations may be stored and indicated as exceptional value(s) within the SCS profile, the storage size of the SCS profile may be minimized or otherwise significantly reduced. Moreover, signaling for any of the non-default SCS configuration(s) may indicate the exceptional value(s) in lieu of complete information of such non-default SCS configuration(s).

Under a fourth proposed scheme in accordance with the present disclosure, an operator of a network (or a user of a UE) may maintain an operator-controlled PLMN list (or a user-controlled PLMN list) of one or more PLMNs with corresponding frequency band information and SCS configurations. Upon power-up or reboot of the UE, the UE may utilize this PLMN list to select one of the listed PLMNs for initial access. The PLMN list may be determined, configured or otherwise updated by the operator (or user), and the PLMNs contained in the PLMN list may be prioritized. For instance, multiple PLMNs in the PLMN list may be ranked or otherwise prioritized by the operator (or user) according to preference of the operator (or user). Moreover, the PLMN list may be stored in a SIM of the UE, a memory of the UE, or both.

As an illustrative example, an existing elementary file (EF) named $EF_{OPLMNwACT}$ for an operator-controlled PLMN selector with access technology may be extended to include an operator-controlled SCS profile. Similarly, an existing EF named $EF_{PLMNwACT}$ for a user-controlled PLMN selector with access technology may be extended to include a user-controlled SCS profile. Thus, during roaming when a UE cannot find or connect to a registered PLMN or a home PLMN, the UE may refer to $EF_{OPLMNwACT}$ or $EF_{PLMNwACT}$ to utilize the operator-controlled or user-controlled PLMN list to identify one or more PLMNs corresponding to a current location of the UE. Accordingly, cell selection during initial access may be performed by the UE more efficiently as blind detection may be avoided. This may improve user experience, enhance system performance, and reduce power consumption by the UE.

Under a fifth proposed scheme in accordance with the present disclosure, for initial access, a UE may first determine a current location ID of its current location for use in cell selection. For instance, the UE may determine the current location ID by mapping positioning information pertaining to the current location of the UE and/or analyzing system information of the UE. The positioning information may be provided by or otherwise obtained from any suitable positioning mechanism such as, for example and without limitation, the Global Navigation Satellite System (GNSS), Global Positioning System (GPS), Global Navigation Satellite System (GLONASS), BeiDou Navigation Satellite System (BDS), Galileo, Indian Regional Navigation Satellite System (IRNSS), Quasi-Zenith Satellite System (QZSS), Legenda and/or a WiFi or $3^{rd}$ Generation Partnership Project (3GPP)-based mechanism.

Under the fifth proposed scheme, the current location ID may be retrieved by system information. For instance, the UE may retrieve the current location ID based on a PLMN ID of a PLMN to which the UE is connected. Additionally, the current location ID may indicate a Mobile Country Code (MCC). For initial access, the UE may determine a current location ID and then prioritize particular PLMNs (e.g., by considering or otherwise determining whether a SCS profile is valid or provisioned for each of the PLMNs) in a PLMN list according to the current location ID for selection of a cell for initial access. For instance, based on the MCC indicated in the current location ID, the UE may be aware of the country/region in which it is located and, accordingly, prioritize its list of PLMNs for cell selection (e.g., selecting cell(s) corresponding to PLMN(s) in the country in which the UE is located over cell(s) corresponding to PLMN(s) in other countries) for cell selection for initial access.

Under a sixth proposed scheme in accordance with the present disclosure, for a multi-mode UE capable of operating in multiple modes (e.g., performing wireless communications using one or more Radio Access Technologies (RATs)), for initial access the UE may first detect or otherwise determine whether there is any valid SCS configuration stored in a SIM or a memory of the UE. The UE may determine whether one or more valid SCS profiles exist (in the SIM or memory of the UE) based on PLMN ID, MMC and/or current location information (e.g., based on a SCS profile, RAT profile, PLMN profile or MCC profile). In an event that there is at least one valid SCS configuration detected, the UE may perform initial access in accordance with one or more of the proposed schemes described above. In an event that there is no valid SCS configuration detected, the UE may perform initial access using one or more alternative PLMN selection mechanisms.

In a first alternative PLMN selection mechanism, the UE may select a 5G/NR cell which is found in one or more previous searches for a cell of a Home PLMN (HPLMN), an Equivalent Home PLMN (EHPLMN), or a Registered PLMN (RPLMN). In a second alternative PLMN selection mechanism, the UE may skip selection of a 5G/NR cell and, instead, select another Radio Access Technology (RAT) such as, for example and without limitation, LTE, LTE-Advanced or LTE-Advanced Pro. In a third alternative PLMN selection mechanism, the UE may search for a 5G/NR cell by using a predefined SCS configuration. The predefined SCS configuration may include a default SCS configuration specified in pertinent standard(s). Alternatively, or additionally, the predefined SCS configuration may include one or more multiple SCS configurations.

Under the sixth proposed scheme, even in cases in which the UE selects a non-NR cell (e.g., an LTE cell), the network may provision corresponding SCS configuration to update a SCS profile stored in the SIM or memory of the UE for further cell selection/reselection procedures. The decision for SCS configuration provisioning may be based on user subscription and/or indication of or negotiation with respect to NR capability of the UE. Additionally, the provisioning may be stored in a SIM of the UE (e.g., USIM, eSIM, eUICC, iSIM or iUICC) or a memory of the UE. Moreover, the provisioning may be performed using standardized protocol(s) (e.g., RRC, NAS, SIB, Open Mobile Alliance (OMA) Device Management (DM), USIM profiling and the like) or proprietary protocol(s). For instance, based on 5G/NR capability and/or user subscription associated with a roaming UE which is currently connected to an LTE cell operated by a service provider, the service provider may use RRC, NAS, SIB or OMA signaling to provide a SCS configuration of an available 5G/NR cell operated by the service provider to which the UE can connect when the UE can establish wireless communication with such 5G/NR cell.

Under a seventh proposed scheme in accordance with the present disclosure, for a multi-mode UE performing initial access when there is no available HPLMN, EHPLMN or RPLMN cell (e.g., when the UE is outside its home country), the UE may first detect or otherwise determine whether there is any valid SCS profile stored in a SIM or a memory of the UE. The UE may determine whether one or more valid SCS configuration stored in a SIM or a memory of the UE. The UE may determine whether one or more valid SCS profiles exist (in the SIM or memory of the UE) based on PLMN ID, MMC and/or current location information (e.g., based on a SCS profile, RAT profile, PLMN profile or MCC profile). In an event that there is at least one valid SCS configuration detected, the UE may perform initial access in accordance with one or more of the proposed schemes described above. In an event that there is no valid SCS configuration detected, the UE may perform initial access using one or more alternative PLMN selection mechanisms.

In a first alternative PLMN selection mechanism, the UE may skip selection of a 5G/NR cell and, instead, select another RAT such as, for example and without limitation, LTE, LTE-Advanced or LTE-Advanced Pro. In a second alternative PLMN selection mechanism, the UE may search for a 5G/NR cell by using a predefined SCS configuration. The predefined SCS configuration may include a default SCS configuration specified in pertinent standard(s). Alternatively, or additionally, the predefined SCS configuration may include one or more multiple SCS configurations. For instance, when the MCC indicates that the UE is outside its home country, the UE may implement the first alternative to select a non-5G/non-NR cell (e.g., LTE cell) for initial access. Otherwise, the UE may implement the second alternative to attempt to connect to a 5G/NR cell.

Under the seventh proposed scheme, even in cases in which the UE selects a non-NR cell (e.g., an LTE cell), the network may provision corresponding SCS configuration to update a SCS profile stored in the SIM or memory of the UE for further cell selection/reselection procedures. The decision for SCS configuration provisioning may be based on user subscription and/or indication of or negotiation with respect to 5G/NR capability of the UE. Additionally, the provisioning may be SIM-based (e.g., USIM-based) or UE-based. Moreover, the provisioning may be performed using standardized protocol(s) (e.g., RRC, NAS, SIB, OMA DM, USIM profiling and the like) or proprietary protocol(s). For instance, based on 5G/NR capability and/or user subscription associated with a roaming UE which is currently connected to an LTE cell operated by a service provider, the service provider may use RRC, NAS, SIB or OMA signaling to provide a SCS configuration of an available 5G/NR cell operated by the service provider to which the UE can connect when the UE can establish wireless communication with such 5G/NR cell.

Illustrative Implementations

FIG. 1 illustrates an example communication environment 100 having an example apparatus 110 and an example apparatus 120 in accordance with an implementation of the present disclosure. Each of apparatus 110 and apparatus 120 may perform various functions to implement schemes, techniques, processes and methods described herein pertaining to enhanced cell selection mechanisms in mobile communications, including various schemes described above as well as processes 200, 300, 400 and 500 described below.

Each of apparatus 110 and apparatus 120 may be a part of an electronic apparatus, which may be a UE such as a portable or mobile apparatus, a wearable apparatus, a wireless communication apparatus or a computing apparatus. For instance, each of apparatus 110 and apparatus 120 may be implemented in a smartphone, a smartwatch, a personal digital assistant, a digital camera, or a computing equipment such as a tablet computer, a laptop computer or a notebook computer. Alternatively, each of apparatus 110 and apparatus 120 may also be a part of a machine type apparatus, which may be a 5G/NR apparatus such as an immobile or a stationary apparatus, a home apparatus, a wireless communication apparatus or a computing apparatus. For instance, each of apparatus 110 and apparatus 120 may be implemented in a smart thermostat, a smart fridge, a smart door lock, a wireless speaker or a home control center. Alternatively, each of apparatus 110 and apparatus 120 may be implemented in the form of one or more integrated-circuit (IC) chips such as, for example and without limitation, one or more single-core processors, one or more multi-core processors, or one or more complex-instruction-set-computing (CISC) processors. Each of apparatus 110 and apparatus 120 may include at least some of those components shown in FIG. 1 such as a processor 112 and a processor 122, respectively. Each of apparatus 110 and apparatus 120 may further include one or more other components not pertinent to the proposed scheme of the present disclosure (e.g., internal power supply, display device and/or user interface device), and, thus, such component(s) of each of apparatus 110 and apparatus 120 are neither shown in FIG. 1 nor described below in the interest of simplicity and brevity.

In some implementations, at least one of apparatus 110 and apparatus 120 may be a part of an electronic apparatus, which may be a network node such as a transmit/receive point (TRP), a base station, a small cell, a router or a gateway. For instance, at least one of apparatus 110 and apparatus 120 may be implemented in an eNodeB in an LTE, LTE-Advanced or LTE-Advanced Pro network or in a gNB or TRP in a 5G, NR, IoT or NB-IoT network. Alternatively, at least one of apparatus 110 and apparatus 120 may be implemented in the form of one or more IC chips such as, for example and without limitation, one or more single-core processors, one or more multi-core processors, or one or more CISC processors.

In one aspect, each of processor 112 and processor 122 may be implemented in the form of one or more single-core processors, one or more multi-core processors, or one or more CISC processors. That is, even though a singular term "a processor" is used herein to refer to processor 112 and processor 122, each of processor 112 and processor 122 may include multiple processors in some implementations and a single processor in other implementations in accordance with the present disclosure. In another aspect, each of processor 112 and processor 122 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 112 and processor 122 is a special-purpose machine specifically designed, arranged and configured to perform specific tasks including enhanced cell selection mechanism in mobile communications in accordance with various implementations of the present disclosure.

In some implementations, apparatus 110 may also include a transceiver 116 coupled to processor 112 and capable of wirelessly transmitting and receiving data. In some implementations, apparatus 110 may further include a memory 114 coupled to processor 112 and capable of being accessed by processor 112 and storing data therein. In some implementations, apparatus 110 may include a SIM 118, which may be in the form of a USIM, eSIM, eUICC, iSIM or iUICC. Either or both of memory 114 and SIM 118 may be capable of storing one or more profiles 115 therein. Each of the one or more profiles 115 may contain one or more SCS configurations as described above. The one or more profiles 115 may include one or more SCS profiles, one or more RAT profiles, one or more PLMN profiles and/or one or more MCC profiles.

In some implementations, apparatus 120 may also include a transceiver 126 coupled to processor 122 and capable of wirelessly transmitting and receiving data. In some implementations, apparatus 120 may further include a memory 124 coupled to processor 122 and capable of being accessed by processor 122 and storing data therein. Accordingly, apparatus 110 and apparatus 120 may wirelessly communicate with each other via transceiver 116 and transceiver 126, respectively.

To aid better understanding, the following description of the operations, functionalities and capabilities of each of apparatus 110 and apparatus 120 is provided in the context of a mobile communication environment in which apparatus 110 is implemented in or as a wireless communication device, a communication apparatus or a UE and apparatus 120 is implemented in or as a network node (e.g., base station) connected or otherwise communicatively coupled to a network 130.

In one aspect, for enhancement of 5G/NR system performance, processor 112 of apparatus 110 as a UE may perform a cell selection or reselection procedure to select a cell of a wireless network. Moreover, processor 112 may establish, via transceiver 116, a wireless connection with apparatus 120 as a network node (e.g., base station) of the selected cell.

In some implementations, in performing the cell selection or reselection procedure, processor 112 may perform either a first procedure or a second procedure. With respect to the first procedure, processor 112 may select a PLMN. Additionally, processor 112 may determine a frequency band associated with the PLMN and a SCS configuration corresponding to the PLMN by checking a profile. Moreover, processor 112 may perform the cell selection or reselection procedure in the frequency band based on the SCS configuration. With respect to the second procedure, processor 112 may select the frequency band. Additionally, processor 112 may determine the SCS configuration corresponding to the frequency band by checking the profile. Moreover, processor 112 may perform the cell selection or reselection procedure in the frequency band based on the SCS configuration.

In some implementations, the profile may be stored in SIM 128 of apparatus 110, memory 114 of apparatus 110, or both.

In some implementations, SIM 128 may include a USIM, an eSIM, an eUICC, an iSIM or an iUICC.

In some implementations, the profile may include a SCS profile, a RAT profile, a PLMN profile or an MCC profile.

In some implementations, the profile may include a SCS profile containing one or more SCS configurations including the SCS configuration. Moreover, each of the one or more SCS configurations may be associated with respective PLMN information, respective frequency band information, or both.

In some implementations, the respective frequency band information may be associated with one or more of respective channel bandwidth, a respective resource block, a respective TTI, and a respective modulation.

In some implementations, the profile may include a SCS profile containing one or more SCS configurations including the SCS configuration. Additionally, each of the one or more SCS configurations may be associated with a corresponding validity timer representative of a lifetime of a respective SCS configuration of the one or more SCS configurations.

In some implementations, a value of the corresponding validity timer associated with each SCS configuration of the one or more SCS configurations may persist across reboot of apparatus 110, change of SIM 118, or both. Alternatively, the value of the corresponding validity timer associated with each SCS configuration of the one or more SCS configurations may be reset upon reboot of apparatus 110, change of SIM 118, or both. In some implementations, the value of the corresponding validity timer associated with each SCS configuration of the one or more SCS configurations may be set by a user of apparatus 110 or the wireless network.

In some implementations, processor 112 may update the profile upon either completion of the cell selection or reselection procedure or receiving information related to one or more SCS configurations in the profile.

In some implementations, processor 112 may maintain a default SCS configuration among the one or more SCS configurations in the profile. In maintaining the default SCS configuration, processor 112 may perform a number of operations. For instance, processor 112 may store a default value for the default SCS configuration in a default value table. Additionally, processor 112 may store a respective exceptional value for each remaining SCS configuration of the one or more SCS configurations as a respective difference relative to the default value.

In some implementations, in receiving the information related to the one or more SCS configurations in the profile, processor 112 may perform either of the following: (a) receiving signaling from the wireless network pertaining to the one or more SCS configurations in the profile; and (b) retrieving the information from SIM 118 or memory 114.

In some implementations, in updating the profile, processor 112 may perform a number of operations. For instance, processor 112 may reference the default value table. Moreover, processor 112 may maintain the default value without change responsive to a value indicated in the information being identical to the default value.

In some implementations, in determining the SCS configuration corresponding to the frequency band, processor 112 may apply the default value responsive to no entry of any SCS configuration in the profile corresponding to the frequency band.

In some implementations, in receiving the signaling, processor 112 may receive RRC signaling, NAS signaling, or signaling used in a 3GPP system.

In some implementations, processor 112 may store a PLMN list in SIM 118, memory 114, or both. In some implementations, the PLMN list may contain a plurality of PLMNs that are prioritized. In some implementations, in selecting the PLMN, processor 112 may select one of the plurality of PLMNs having a priority higher than that of at least another PLMN of the plurality of PLMNs in the list. In some implementations, an elementary file (EF) may be extended to include one or more SCS configurations in the profile.

In one aspect, as a location-based solution, processor 112 of apparatus 110 as a UE may determine a location ID of a current location of apparatus 110. Additionally, processor 112 may prioritize a PLMN list of a plurality of PLMNs according to the location ID. Moreover, processor 112 may perform, based on the prioritized PLMN list, a cell selection or reselection procedure to select a cell of a wireless network associated with one of the plurality of PLMNs.

In some implementations, the location ID may include an MCC. In some implementations, in determining the location ID of the current location of apparatus 110, processor 112 may map position information of apparatus 110 or analyzing system information of apparatus 110.

In some implementations, in prioritizing the PLMN list, processor 112 may determine whether a SCS profile is valid or provisioned for one or more PLMNs in the PLMN list.

In some implementations, in determining the location ID of the current location of apparatus 110, processor 112 may obtain position information of apparatus 110 from a GNSS, GPS, GLONASS, BDS, Galileo, IRNSS, QZSS, Legenda, WiFi, or 3GPP-based mechanism.

In one aspect, for 5G/NR configuration provisioning, processor 112 of apparatus 110 as a multi-mode UE may detect, by checking a profile, for a valid SCS configuration is available for establishing a wireless connection with a second RAT (e.g., 5G/NR). Moreover, processor 112 may select one of a plurality of cell selection mechanisms responsive to no valid SCS configuration being detected. Furthermore, processor 112 may establish, using the selected one of the plurality of cell selection mechanisms, a wireless connection with a first cell using a first RAT (e.g., LTE) different than the second RAT.

In some implementations, the profile may include a SCS profile, a RAT profile, a PLMN profile or an MCC profile.

In some implementations, processor 112 may store the profile in SIM 118, memory 114, or both.

In some implementations, SIM 118 may include a USIM, an eSIM, an eUICC, an iSIM or an iUICC.

In some implementations, processor 112 may further perform a number of operations. For instance, processor 112 may receive information for updating the profile which is an SCS profile. Additionally, processor 112 may update a SCS configuration of one or more SCS configurations in the SCS profile using the received information. Moreover, processor 112 may establish, based on the updated SCS configuration, a wireless connection with a second cell using the second RAT. In some implementations, each of the one or more SCS configurations may be associated with respective PLMN information, respective frequency band information, or both.

In some implementations, in receiving the information, processor 112 may perform either of the following: (a) receiving provisioning from the first cell via a standardized protocol or a proprietary protocol; and (b) receiving user input containing the information from a user of apparatus 110.

In some implementations, the standardized protocol may include RRC signaling, NAS signaling, SIB signaling, OMA DM signaling or USIM profiling signaling. In some implementations, the provisioning may be based on a user subscription associated with apparatus 110, a capability of apparatus 110 to wirelessly communicate using the second RAT, or both.

In some implementations, processor 112 may determine whether a cell of a HPLMN, an EHPLMN, or a RPLMN is available. In some implementations, regardless of a result of the determining, the plurality of cell selection mechanisms may include a first mechanism and a second mechanism. The first mechanism may involve skipping selection of any cell of the second RAT by selecting from cells of the first RAT, a third RAT different than the second RAT, or a combination thereof. The second mechanism may involve searching for any cell of the second RAT using a predefined SCS configuration. In some implementations, responsive to the result of the determining indicating no cell of the HPLMN, the EHPLMN or the RPLMN is available, the plurality of cell selection mechanisms may further include a third mechanism. The third mechanism may involve selecting a cell of the second RAT which is found in one or more previous searches for any cell of the HPLMN, the EHPLMN or the RPLMN.

In some implementations, the predefined SCS configuration may include a default SCS configuration specified in a standard or one or more SCS configurations.

In one aspect, for enhancement of 5G/NR system performance, processor 112 of apparatus 110 as a UE may perform a cell selection or reselection procedure to select a cell of a wireless network. Moreover, processor 112 may establish, via transceiver 116, a wireless connection with apparatus 120 as a network node (e.g., base station) of the selected cell. In some implementations, in performing the cell selection or reselection procedure, processor 112 may determine a frequency band and a SCS configuration by checking a profile. Moreover, processor 112 may perform the cell selection or reselection procedure in the frequency band based on the SCS configuration.

In some implementations, the profile may be stored in SIM 118 of apparatus 110, memory 114 of apparatus 110, or both.

In some implementations, SIM 118 may include a USIM, an eSIM, an eUICC, an iSIM) or an iUICC.

In some implementations, the profile may be received from the network via RRC signaling, NAS signaling, or signaling used in a 3GPP system.

In some implementations, the profile may include a SCS profile, a RAT profile, a PLMN profile or an MCC profile.

In some implementations, the profile may include a SCS profile containing one or more SCS configurations including the SCS configuration. In some implementations, each of the one or more SCS configurations may be associated with respective PLMN information, respective frequency band information, or both.

In some implementations, the respective frequency band information may be associated with one or more of respective channel bandwidth, a respective resource block, a respective TTI, and a respective modulation.

In some implementations, the profile may include a SCS profile containing one or more SCS configurations including the SCS configuration. In some implementations, each of the one or more SCS configurations may be associated with a corresponding validity timer representative of a lifetime of a respective SCS configuration of the one or more SCS configurations.

In some implementations, processor 112 may update the profile upon either completion of the cell selection or reselection procedure or receiving information related to one or more SCS configurations in the profile. In some implementations, processor 112 may also maintain a default SCS configuration among the one or more SCS configurations in the profile. In maintaining the default SCS configuration, processor 112 may perform a number of operations. For instance, processor 112 may store a default value for the default SCS configuration in a default value table. Moreover, processor 112 may store a respective exceptional value for each remaining SCS configuration of the one or more SCS configurations as a respective difference relative to the default value. In some implementations, in receiving the information related to the one or more SCS configurations in the profile, processor 112 may perform either: (a) receiving signaling from the wireless network pertaining to the one or more SCS configurations in the profile; or (b) retrieving the information from SIM 118 of apparatus 110 or memory 114 of apparatus 110. In updating the profile, processor 112 may reference the default value table. Additionally, processor 112 may maintain the default value without change responsive to a value indicated in the information being identical to the default value. In determining the SCS configuration corresponding to the frequency band, processor 112 may apply the default value responsive to no entry of any SCS configuration in the profile corresponding to the frequency band.

In some implementations, in receiving the signaling, processor 112 may receive RRC signaling, NAS signaling, or signaling used in a 3GPP system.

In some implementations, processor 112 may further store a PLMN list in SIM 118 of apparatus 110, memory 114 of apparatus 110, or both. In some implementations, the PLMN list may contain a plurality of PLMNs that are prioritized. Moreover, in selecting the PLMN, processor 112 may select one of the plurality of PLMNs having a priority higher than that of at least another PLMN of the plurality of PLMNs in the list. In some implementations, an elementary file may be extended to include one or more SCS configurations in the profile.

In some implementations, processor 112 may further determine the frequency band by a location ID of a current location of apparatus 110. In some implementations, the location ID may include an MCC. Moreover, in determining the location ID of the current location of apparatus 110, processor 112 may map position information of apparatus 110 or analyzing system information of apparatus 110.

Illustrative Processes

FIG. 2 illustrates an example process 200 in accordance with an implementation of the present disclosure. Process 200 may be an example implementation of the proposed schemes described above with respect to enhanced cell selection mechanisms in mobile communications in accordance with the present disclosure. Process 200 may represent an aspect of implementation of features of apparatus 110 and/or apparatus 120. Process 200 may include one or more operations, actions, or functions as illustrated by one or more of blocks 210 and 220 as well as sub-blocks 2122, 2124, 2126, 2142, 2144 and 2146. Although illustrated as discrete blocks, various blocks of process 200 may be divided into additional blocks, combined into fewer blocks, or eliminated, depending on the desired implementation. Moreover, the blocks of process 200 may executed in the order shown in FIG. 2 or, alternatively, in a different order. Process 200 may also be repeated partially or entirely. Solely for illustrative purposes and without limitation, process 200 is described below in the context of apparatus 110 as a UE and apparatus 120 as a network node (e.g., base station) of a wireless network. Process 200 may begin at block 210.

At 210, process 200 may involve processor 112 of apparatus 110 as a UE performing a cell selection or reselection procedure to select a cell of a wireless network. Process 200 may proceed from 210 to 220.

At 220, process 200 may involve processor 112 establishing, via transceiver 116, a wireless connection with apparatus 120 as a network node (e.g., base station) of the selected cell.

In some implementations, in performing the cell selection or reselection procedure, process 200 may involve processor 112 performing either a first procedure or a second procedure. The first procedure may involve a number of operations represented by sub-blocks 2122, 2124 and 2126. The second procedure may involve a number of operations represented by sub-blocks 2142, 2144 and 2146.

At 2122, process 200 may involve processor 112 selecting a PLMN. Process 200 may proceed from 2122 to 2124.

At 2124, process 200 may involve processor 112 determining a frequency band associated with the PLMN and a SCS configuration corresponding to the PLMN by checking a profile. In some implementations, the profile may be received from the network that via RRC signaling, NAS signaling, or signaling used in a 3rd-Generation Partnership Project (3GPP) system. Process 200 may proceed from 2124 to 2126.

At 2126, process 200 may involve processor 112 performing the cell selection or reselection procedure in the frequency band based on the SCS configuration.

At 2142, process 200 may involve processor 112 selecting the frequency band. Process 200 may proceed from 2142 to 2144.

At 2144, process 200 may involve processor 112 determining the SCS configuration corresponding to the frequency band by checking the profile. Process 200 may proceed from 2144 to 2146.

At 2146, process 200 may involve processor 112 performing the cell selection or reselection procedure in the frequency band based on the SCS configuration.

In some implementations, the profile may be stored in SIM 128 of apparatus 110, memory 114 of apparatus 110, or both.

In some implementations, SIM 128 may include a USIM, an eSIM, an eUICC, an iSIM or an iUICC.

In some implementations, the profile may include a SCS profile, a RAT profile, a PLMN profile or an MCC profile.

In some implementations, the profile may include a SCS profile containing one or more SCS configurations including the SCS configuration. Moreover, each of the one or more SCS configurations may be associated with respective PLMN information, respective frequency band information, or both.

In some implementations, the respective frequency band information may be associated with one or more of respective channel bandwidth, a respective resource block, a respective TTI, and a respective modulation.

In some implementations, the profile may include a SCS profile containing one or more SCS configurations including the SCS configuration. Additionally, each of the one or more SCS configurations may be associated with a corresponding validity timer representative of a lifetime of a respective SCS configuration of the one or more SCS configurations.

In some implementations, a value of the corresponding validity timer associated with each SCS configuration of the one or more SCS configurations may persist across reboot of apparatus 110, change of SIM 118, or both. Alternatively, the value of the corresponding validity timer associated with each SCS configuration of the one or more SCS configurations may be reset upon reboot of apparatus 110, change of SIM 118, or both. In some implementations, the value of the corresponding validity timer associated with each SCS configuration of the one or more SCS configurations may be set by a user of apparatus 110 or the wireless network.

In some implementations, process 200 may also involve processor 112 updating the profile upon either completion of the cell selection or reselection procedure or receiving information related to one or more SCS configurations in the profile.

In some implementations, process 200 may also involve processor 112 maintaining a default SCS configuration among the one or more SCS configurations in the profile. In maintaining the default SCS configuration, process 200 may also involve processor 112 performing a number of operations. For instance, process 200 may also involve processor 112 storing a default value for the default SCS configuration in a default value table. Additionally, process 200 may also involve processor 112 storing a respective exceptional value for each remaining SCS configuration of the one or more SCS configurations as a respective difference relative to the default value.

In some implementations, in receiving the information related to the one or more SCS configurations in the profile, process 200 may also involve processor 112 performing either of the following: (a) receiving signaling from the wireless network pertaining to the one or more SCS configurations in the profile; and (b) retrieving the information from SIM 118 or memory 114.

In some implementations, in updating the profile, process 200 may also involve processor 112 performing a number of operations. For instance, process 200 may also involve processor 112 referencing the default value table. Moreover, process 200 may also involve processor 112 maintaining the default value without change responsive to a value indicated in the information being identical to the default value.

In some implementations, in determining the SCS configuration corresponding to the frequency band, process 200 may also involve processor 112 applying the default value responsive to no entry of any SCS configuration in the profile corresponding to the frequency band.

In some implementations, in receiving the signaling, process 200 may also involve processor 112 receiving RRC signaling, NAS signaling, or signaling used in a 3GPP system.

In some implementations, process 200 may also involve processor 112 storing a PLMN list in SIM 118, memory 114, or both. In some implementations, the PLMN list may contain a plurality of PLMNs that are prioritized. In some implementations, in selecting the PLMN, process 200 may also involve processor 112 selecting one of the plurality of PLMNs having a priority higher than that of at least another PLMN of the plurality of PLMNs in the list. In some implementations, an elementary file (EF) may be extended to include one or more SCS configurations in the profile.

In some implementations, process 200 may further involve processor 112 determining the frequency band by a location ID of a current location of the UE. In some implementations, the location ID may include an MCC. Moreover, in determining the frequency band by the location ID of the current location of the UE, process 200 may involve processor 112 mapping position information of the UE or analyzing system information of the UE.

Figure 3:
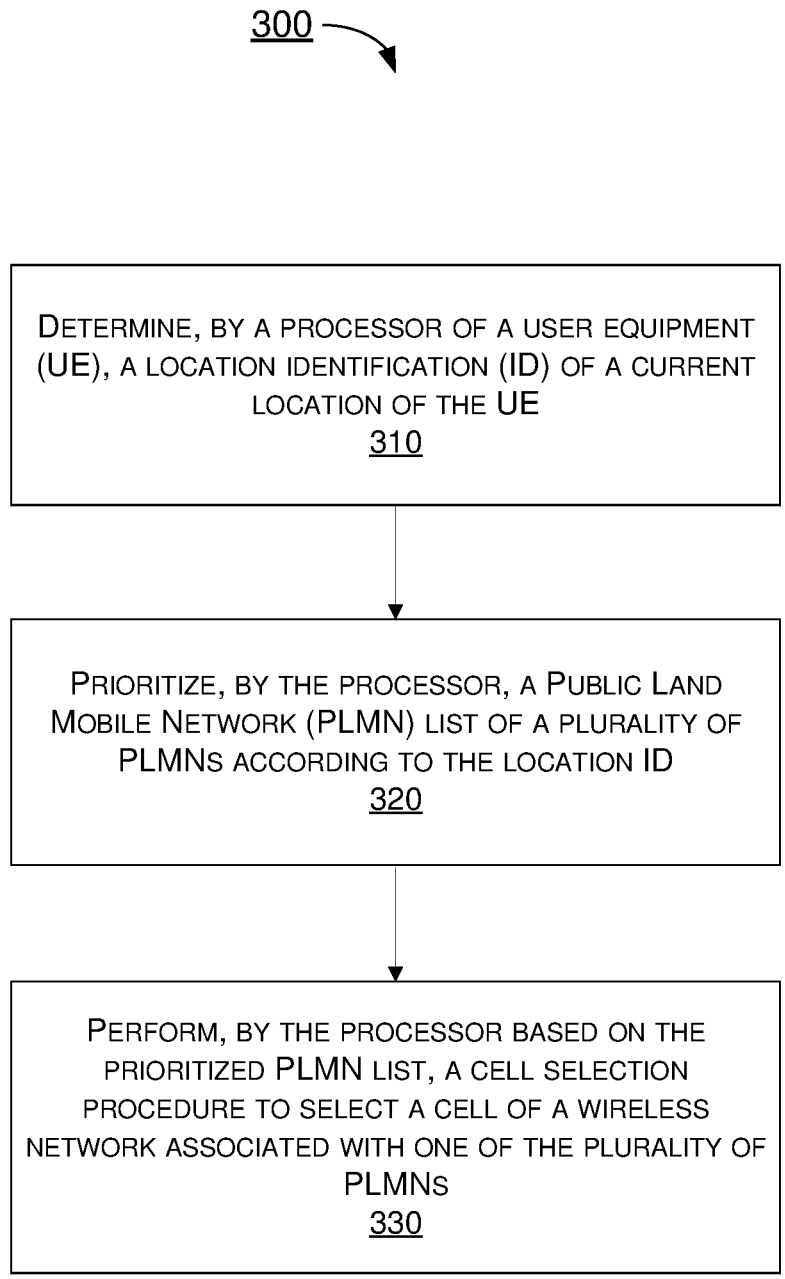
FIG. 3 is a flowchart of an example process in accordance with an implementation of the present disclosure.

FIG. 3 illustrates an example process 300 in accordance with an implementation of the present disclosure. Process 300 may be an example implementation of the proposed schemes described above with respect to enhanced cell selection mechanisms in mobile communications in accordance with the present disclosure. Process 300 may represent an aspect of implementation of features of apparatus 110 and/or apparatus 120. Process 300 may include one or more operations, actions, or functions as illustrated by one or more of blocks 310, 320 and 330. Although illustrated as discrete blocks, various blocks of process 300 may be divided into additional blocks, combined into fewer blocks, or eliminated, depending on the desired implementation. Moreover, the blocks of process 300 may executed in the order shown in FIG. 3 or, alternatively, in a different order. Process 300 may also be repeated partially or entirely. Solely for illustrative purposes and without limitation, process 300 is described below in the context of apparatus 110 as a UE and apparatus 120 as a network node (e.g., base station) of a wireless network. Process 300 may begin at block 310.

At 310, process 300 may involve processor 112 of apparatus 110 as a UE determining a location ID of a current location of apparatus 110. Process 300 may proceed from 310 to 320.

At 320, process 300 may involve processor 112 prioritizing a PLMN list of a plurality of PLMNs according to the location ID. Process 300 may proceed from 320 to 330.

At 330, process 300 may involve processor 112 performing, based on the prioritized PLMN list, a cell selection or reselection procedure to select a cell of a wireless network associated with one of the plurality of PLMNs.

In some implementations, the location ID may include an MCC. In some implementations, in determining the location ID of the current location of apparatus 110, process 300 may involve processor 112 mapping position information of apparatus 110 or analyzing system information of apparatus 110.

In some implementations, in prioritizing the PLMN list, process 300 may involve processor 112 determining whether a SCS profile is valid or provisioned for one or more PLMNs in the PLMN list.

In some implementations, in determining the location ID of the current location of apparatus 110, process 300 may involve processor 112 obtaining position information of apparatus 110 from a GNSS, GPS, GLONASS, BDS, Galileo, IRNSS, QZSS, Legenda, WiFi, or 3GPP-based mechanism.

Figure 4:
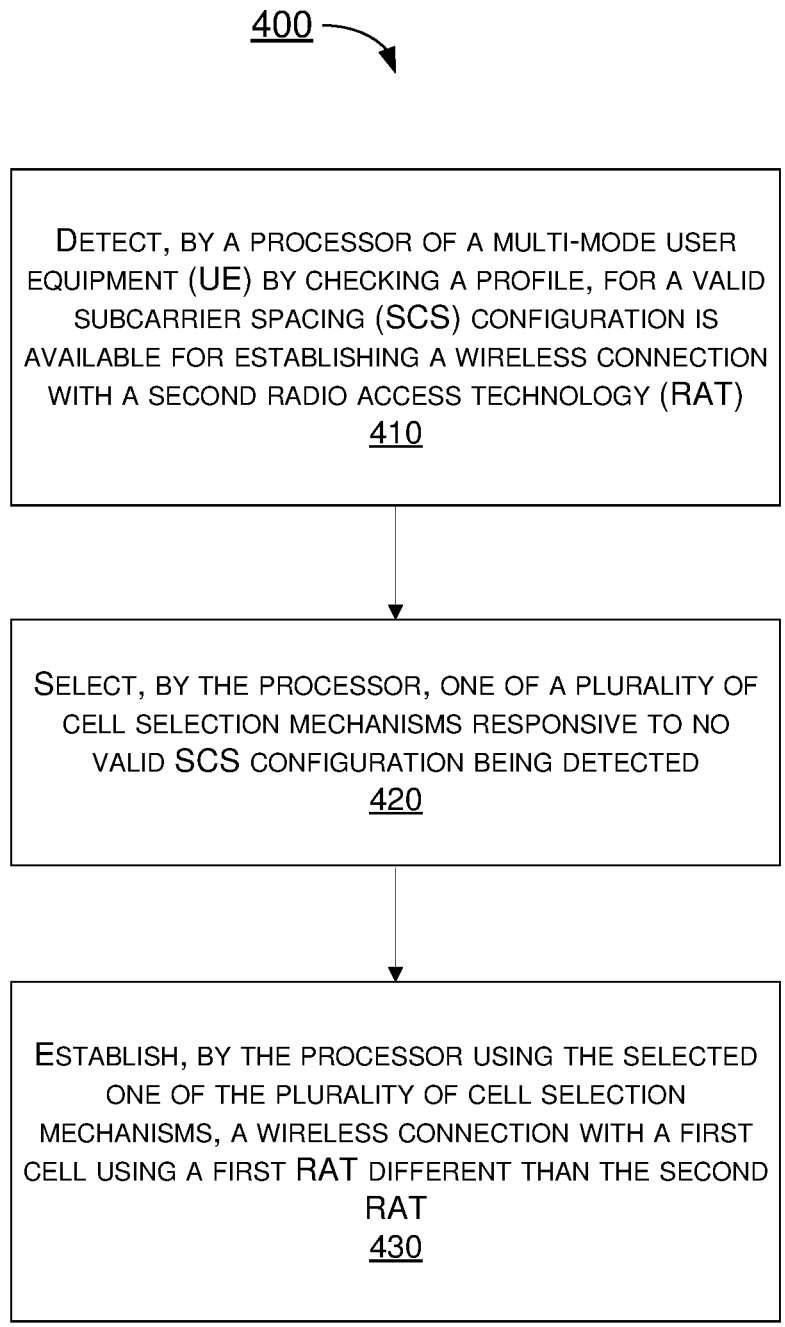
FIG. 4 is a flowchart of an example process in accordance with an implementation of the present disclosure.

FIG. 4 illustrates an example process 400 in accordance with an implementation of the present disclosure. Process 400 may be an example implementation of the proposed schemes described above with respect to enhanced cell selection mechanisms in mobile communications in accordance with the present disclosure. Process 400 may represent an aspect of implementation of features of apparatus 110 and/or apparatus 120. Process 400 may include one or more operations, actions, or functions as illustrated by one or more of blocks 410, 420 and 430. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may also be repeated partially or entirely. Solely for illustrative purposes and without limitation, process 400 is described below in the context of apparatus 110 as a multi-mode UE and apparatus 120 as a network node (e.g., base station) of a wireless network. Process 400 may begin at block 410.

At 410, process 400 may involve processor 112 of apparatus 110 as a multi-mode UE detecting, by checking a profile, for a valid SCS configuration is available for establishing a wireless connection with a second RAT (e.g., 5G/NR). Process 400 may proceed from 410 to 420.

At 420, process 400 may involve processor 112 selecting one of a plurality of cell selection mechanisms responsive to no valid SCS configuration being detected. Process 400 may proceed from 420 to 430.

At 430, process 400 may involve processor 112 establishing, using the selected one of the plurality of cell selection mechanisms, a wireless connection with a first cell using a first RAT (e.g., LTE) different than the second RAT.

In some implementations, the profile may include a SCS profile, a RAT profile, a PLMN profile or an MCC profile.

In some implementations, process 400 may also involve processor 112 storing the profile in SIM 118, memory 114, or both.

In some implementations, SIM 118 may include a USIM, an eSIM, an eUICC, an iSIM or an iUICC.

In some implementations, process 400 may further involve processor 112 performing a number of operations. For instance, process 400 may involve processor 112 receiving information for updating the profile which is an SCS profile. Additionally, process 400 may involve processor 112 updating a SCS configuration of one or more SCS configurations in the SCS profile using the received information. Moreover, process 400 may involve processor 112 establishing, based on the updated SCS configuration, a wireless connection with a second cell using the second RAT. In some implementations, each of the one or more SCS configurations may be associated with respective PLMN information, respective frequency band information, or both.

In some implementations, in receiving the information, process 400 may involve processor 112 performing either of the following: (a) receiving provisioning from the first cell via a standardized protocol or a proprietary protocol; and (b) receiving user input containing the information from a user of apparatus 110.

In some implementations, the standardized protocol may include RRC signaling, NAS signaling, SIB signaling, OMA DM signaling or USIM profiling signaling. In some implementations, the provisioning may be based on a user subscription associated with apparatus 110, a capability of apparatus 110 to wirelessly communicate using the second RAT, or both.

In some implementations, process 400 may further involve processor 112 determining whether a cell of a HPLMN, an EHPLMN, or a RPLMN is available. In some implementations, regardless of a result of the determining, the plurality of cell selection mechanisms may include a first mechanism and a second mechanism. The first mechanism may involve skipping selection of any cell of the second RAT by selecting from cells of the first RAT, a third RAT different than the second RAT, or a combination thereof. The second mechanism may involve searching for any cell of the second RAT using a predefined SCS configuration. In some implementations, responsive to the result of the determining indicating no cell of the HPLMN, the EHPLMN or the RPLMN is available, the plurality of cell selection mechanisms may further include a third mechanism. The third mechanism may involve selecting a cell of the second RAT which is found in one or more previous searches for any cell of the HPLMN, the EHPLMN or the RPLMN.

In some implementations, the predefined SCS configuration may include a default SCS configuration specified in a standard or one or more SCS configurations.

FIG. 5 illustrates an example process 500 in accordance with an implementation of the present disclosure. Process 500 may be an example implementation of the proposed schemes described above with respect to enhanced cell selection mechanisms in mobile communications in accordance with the present disclosure. Process 500 may represent an aspect of implementation of features of apparatus 110 and/or apparatus 120. Process 500 may include one or more operations, actions, or functions as illustrated by one or more of blocks 510 and 520 as well as sub-blocks 5102 and 5104. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may also be repeated partially or entirely. Solely for illustrative purposes and without limitation, process 500 is described below in the context of apparatus 110 as a UE and apparatus 120 as a network node (e.g., base station) of a wireless network. Process 500 may begin at block 510.

At 510, process 500 may involve processor 112 of apparatus 110 as a UE performing a cell selection or reselection procedure to select a cell of a wireless network. Process 500 may proceed from 510 to 520.

At 520, process 500 may involve processor 112 establishing, via transceiver 116, a wireless connection with apparatus 120 as a network node (e.g., base station) of the selected cell.

In some implementations, in performing the cell selection or reselection procedure, process 200 may involve processor 112 performing a number of operations represented by sub-blocks 5102 and 5104.

At 5102, process 500 may involve processor 112 determining a frequency band and a SCS configuration by checking a profile. Process 500 may proceed from 5102 to 5104.

At 5104, process 500 may involve processor 112 performing the cell selection or reselection procedure in the frequency band based on the SCS configuration.

In some implementations, process 500 may further involve processor 112 storing a PLMN list in SIM 118 of apparatus 110, memory 114 of apparatus 110, or both. In some implementations, the PLMN list may contain a plurality of PLMNs that are prioritized. Moreover, in selecting the PLMN, process 500 may further involve processor 112 selecting one of the plurality of PLMNs having a priority higher than that of at least another PLMN of the plurality of PLMNs in the list. In some implementations, an elementary file may be extended to include one or more SCS configurations in the profile.

In some implementations, process 500 may further involve processor 112 determining the frequency band by a location ID of a current location of apparatus 110. In some implementations, the location ID may include an MCC. Moreover, in determining the location ID of the current location of apparatus 110, process 500 may involve processor 112 mapping position information of apparatus 110 or analyzing system information of apparatus 110.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

determining, by a processor of a user equipment (UE), a frequency band and a subcarrier spacing (SCS) configuration by checking a profile;

performing, by the processor, a cell selection or reselection procedure using the frequency band and the SCS configuration to select a cell of a wireless network;

establishing, by the processor, a wireless connection with the selected cell;

updating, by the processor, the profile upon either completion of the cell selection or reselection procedure, or receiving information related to one or more SCS configurations in the profile; and maintaining, by the processor, a default SCS configuration among the one or more SCS configurations in the profile, wherein the maintaining of the default SCS configuration comprises:

storing a default value for the default SCS configuration in a default value table; and storing a respective exceptional value for each remaining SCS configuration of the one or more SCS configurations as a respective difference relative to the default value, wherein the receiving of the information related to the one or more SCS configurations in the profile comprises either:

receiving signaling from the wireless network pertaining to the one or more SCS configurations in the profile; or retrieving the information from a Subscriber Identity Module (SIM) of the UE or a memory of the UE, wherein the updating of the profile comprises:
  referencing the default value table; and
  maintaining the default value without change responsive to a value indicated in the information being identical to the default value, and
wherein the determining of the SCS configuration corresponding to the frequency band comprises applying the default value responsive to no entry of any SCS configuration in the profile corresponding to the frequency band.

2. The method of claim 1, wherein the profile is stored in a Subscriber Identity Module (SIM) of the UE, a memory of the UE, or both.

3. The method of claim 2, wherein the SIM comprises a Universal Subscriber Identity Module (USIM), an embedded SIM (eSIM), an embedded Universal Integrated Circuit Card (eUICC), an integrated SIM (iSIM) or an integrated UICC (iUICC).

4. The method of claim 1, wherein the profile is received from the network via Radio Resource Control (RRC) signaling, Non-Access Stratum (NAS) signaling, or signaling used in a $3^{rd}$-Generation Partnership Project (3GPP) system.

5. The method of claim 1, wherein the profile comprises a SCS profile, a Radio Access Technology (RAT) profile, a Public Land Mobile Network (PLMN) profile or a Mobile Country Code (MCC) profile.

6. The method of claim 1, wherein the profile comprises a SCS profile containing one or more SCS configurations including the SCS configuration, and wherein each of the one or more SCS configurations is associated with respective Public Land Mobile Network (PLMN) information, respective frequency band information, or both.

7. The method of claim 6, wherein the respective frequency band information is associated with one or more of respective channel bandwidth, a respective resource block, a respective transmission time interval (TTI), and a respective modulation.

8. The method of claim 1, wherein the profile comprises a SCS profile containing one or more SCS configurations including the SCS configuration, and wherein each of the one or more SCS configurations is associated with a corresponding validity timer representative of a lifetime of a respective SCS configuration of the one or more SCS configurations.

9. The method of claim 1, wherein the receiving of the signaling comprises receiving Radio Resource Control (RRC) signaling, Non-Access Stratum (NAS) signaling, or signaling used in a $3^{rd}$-Generation Partnership Project (3GPP) system.

10. The method of claim 1, further comprising:
  storing, by the processor, a Public Land Mobile Network (PLMN) list in a Subscriber Identity Module (SIM) of the UE, a memory of the UE, or both,
  wherein the PLMN list contains a plurality of PLMNs that are prioritized,
  wherein the selecting of the PLMN comprises selecting one of the plurality of PLMNs having a priority higher than that of at least another PLMN of the plurality of PLMNs in the list, and
  wherein an elementary file (EF) is extended to include one or more SCS configurations in the profile.

11. The method of claim 1, further comprising:
  determining the frequency band by a location identification (ID) of a current location of the UE,
  wherein the location ID comprises a Mobile Country Code (MCC), and
  wherein the determining of the location ID of the current location of the UE comprises mapping position information of the UE or analyzing system information of the UE.

* * * * *